(12) United States Patent
Kuroda

(10) Patent No.: US 11,036,819 B2
(45) Date of Patent: Jun. 15, 2021

(54) INFORMATION PROCESSING APPARATUS, METHOD FOR CONTROLLING THE SAME, AND STORAGE MEDIUM

(71) Applicant: CANON KABUSHIKI KAISHA, Tokyo (JP)

(72) Inventor: Shigeki Kuroda, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 758 days.

(21) Appl. No.: 14/658,472

(22) Filed: Mar. 16, 2015

(65) Prior Publication Data

US 2015/0269266 A1 Sep. 24, 2015

(30) Foreign Application Priority Data

Mar. 24, 2014 (JP) .............................. JP2014-060796

(51) Int. Cl.
*G06F 16/954* (2019.01)
*G06F 16/957* (2019.01)
*G06F 16/955* (2019.01)

(52) U.S. Cl.
CPC .......... *G06F 16/954* (2019.01); *G06F 16/957* (2019.01); *G06F 16/9566* (2019.01)

(58) Field of Classification Search
CPC .... G06F 17/24; G06F 17/25; G06F 17/30876; G06F 17/30873; G06F 17/30887; G06F 17/30899; G06T 11/60; A63F 2300/5553; A63F 2300/6623
USPC ................................ 715/201, 202, 230, 255
See application file for complete search history.

(56) References Cited

U.S. PATENT DOCUMENTS

| 8,412,766 | B1* | 4/2013 | Meymann | H04L 67/22 709/203 |
|---|---|---|---|---|
| 2001/0053295 | A1 | 12/2001 | Kujirai et al. | 399/79 |
| 2002/0161801 | A1* | 10/2002 | Hind | G06F 17/2247 715/239 |
| 2009/0006580 | A1* | 1/2009 | Asai | H04L 67/02 709/219 |
| 2010/0128298 | A1* | 5/2010 | Matsugashita | G06F 3/1288 358/1.13 |
| 2012/0033257 | A1* | 2/2012 | Okazawa | H04L 41/0803 358/1.15 |
| 2012/0086969 | A1* | 4/2012 | Tsujimoto | H04N 1/00244 358/1.13 |

(Continued)

FOREIGN PATENT DOCUMENTS

| CN | 101335767 A | 12/2008 |
|---|---|---|
| JP | 2012-088940 | 5/2012 |

*Primary Examiner* — Kavita Stanley
*Assistant Examiner* — Jenq-Kang Chu
(74) *Attorney, Agent, or Firm* — Venable LLP

(57) ABSTRACT

This information processing apparatus transmits screen data for displaying a screen of a first application to a web browser operating on an external apparatus. When receiving a screen transition instruction for transiting from the screen of the first application to a screen of a second application, the apparatus stores transition destination information indicating at least a return destination screen in a storage unit, and transmits screen data for displaying the screen of the second application to the web browser. When receiving a return instruction for returning from the screen of the second application to an original screen, the apparatus determines a return destination screen based on the transition destination information stored in the storage unit.

6 Claims, 13 Drawing Sheets

(56) References Cited

U.S. PATENT DOCUMENTS

| | | | | |
|---|---|---|---|---|
| 2012/0144329 A1* | 6/2012 | Sasaki | ............... | G06F 9/44505 |
| | | | | 715/764 |
| 2013/0054669 A1* | 2/2013 | Nachreiner | ............ | G06F 9/547 |
| | | | | 709/201 |
| 2013/0060889 A1* | 3/2013 | Miyazawa | ............. | H04L 63/08 |
| | | | | 709/217 |
| 2014/0082715 A1* | 3/2014 | Grajek | ............... | H04L 63/0815 |
| | | | | 726/8 |
| 2014/0139878 A1* | 5/2014 | Kadota | ............... | G06K 15/183 |
| | | | | 358/1.15 |

* cited by examiner

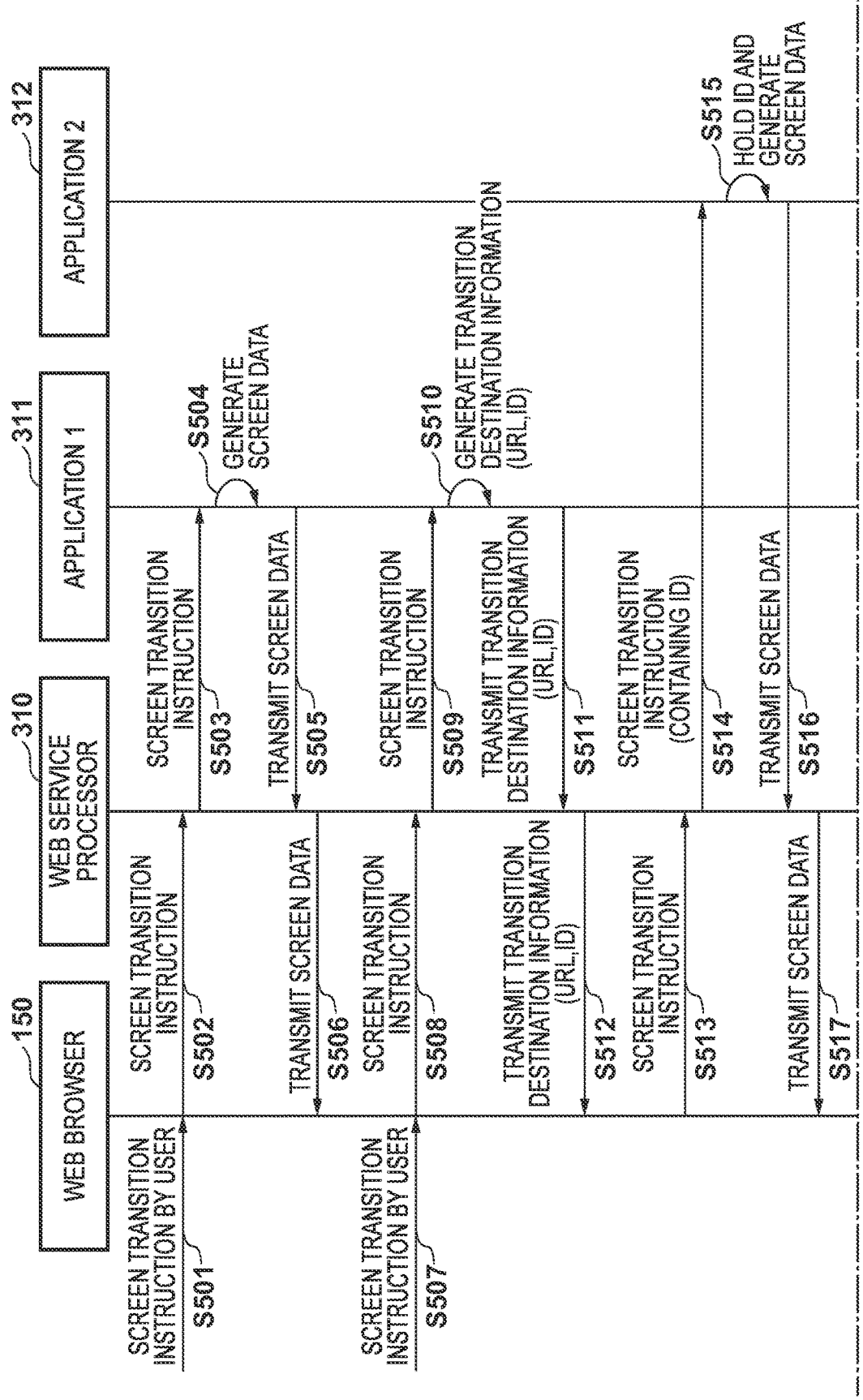

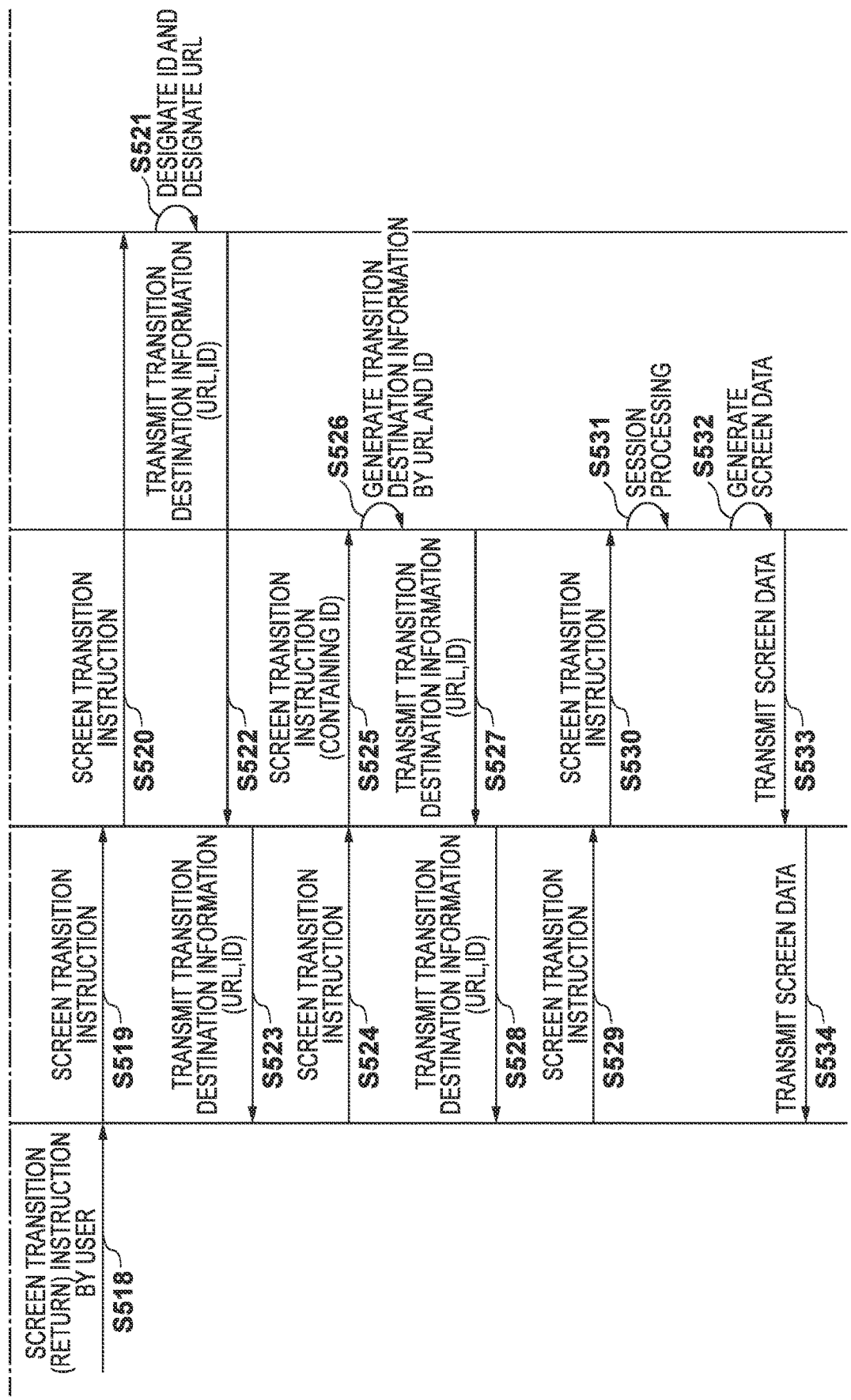

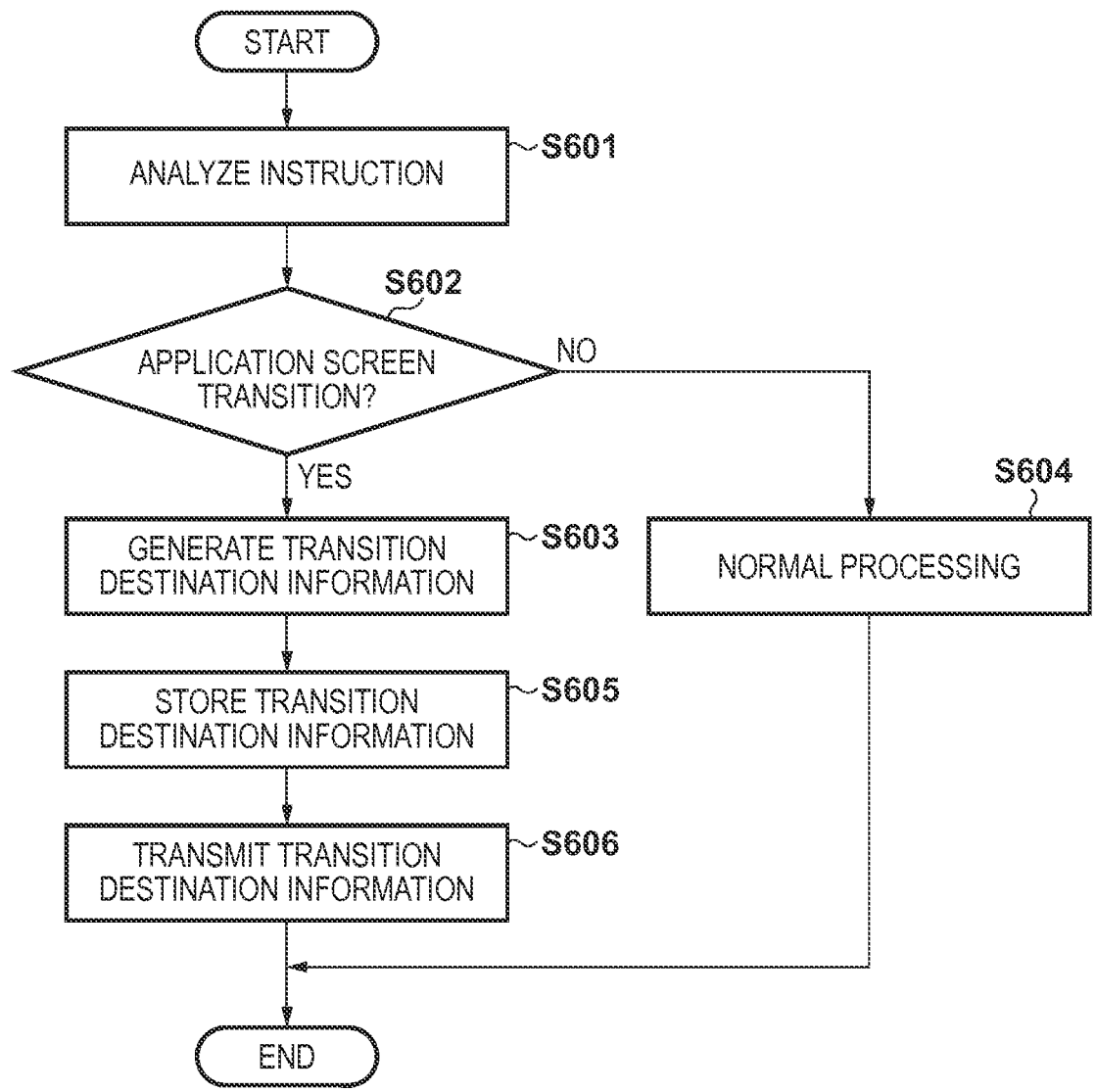

FIG. 9

TOTAL NUMBER N

| No. | SCREEN ID | URL |
|---|---|---|
| 1 | AAAAAAA | A1.cgi |
| 2 | BBBBBBB | B1.cgi |
| 3 | CCCCCCC | C1.cgi |
| ... | | |

| ⊕ | TO PORTAL | LOGIN USER : Axxxxxxx | LOG OUT |

SETTING/REGISTRATION — MAIL TO MANAGER

[ REBOOT OF DEVICE ]

SETTING/
REGISTRATION:MANAGEMENT SETTING:LICENSE/
OTHERS

ENVIRONMENTAL SETTING
   SHEET SETTING
   TIMER/POWER SETTING
   NETWORK
   EXTERNAL INTERFACE
   VOLUME CONTROL

MANAGEMENT SETTING:LICENSE/OTHERS
   BULLETIN BOARD/SUPPORT LINK
   REMOTE SETTING
   XXX SETTING
   SOFTWARE REGISTRATION/UPDATE

☐ 1001

FUNCTION SETTING
   COMMON
   COPY
   PRINTER
   OUTSIDE TRANSMISSION
   RECEPTION/TRANSFER
   FILE SAVE/USE
 DESTINATION SETTING
MANAGEMENT SETTING
   USER MANAGEMENT
   DEVICE MANAGEMENT
 ☐ LICENSE/OTHERS
   DATA MANAGEMENT

1010

| ⊕ Xxxxxxx ADVANCE | TO PORTAL | LOGIN USER : Axxxxxxx | LOGOUT |

SOFTWARE REGISTRATION/UPDATE

DEVICE SERIAL No.
APPLICATION/
OPTION INSTALLATION
 ☐ MANUAL INSTALLATION
   DISTRIBUTION INSTALLATION
FIRMWARE UPDATE
   MANUAL UPDATE
CONFIRMATION OF
DISTRIBUTION SERVER
   LOG DISPLAY/
   COMMUNICATION TEST

APPLICATION/
OPTION INSTALLATION > MANUAL INSTALLATION

MANUAL INSTALLATION

[ NEXT > ]

PATH OF LICENSE FILE [ REFERENCE... ]
PATH OF APPLICATION FILE [ REFERENCE... ]

☐

[ RETURN ] 1011

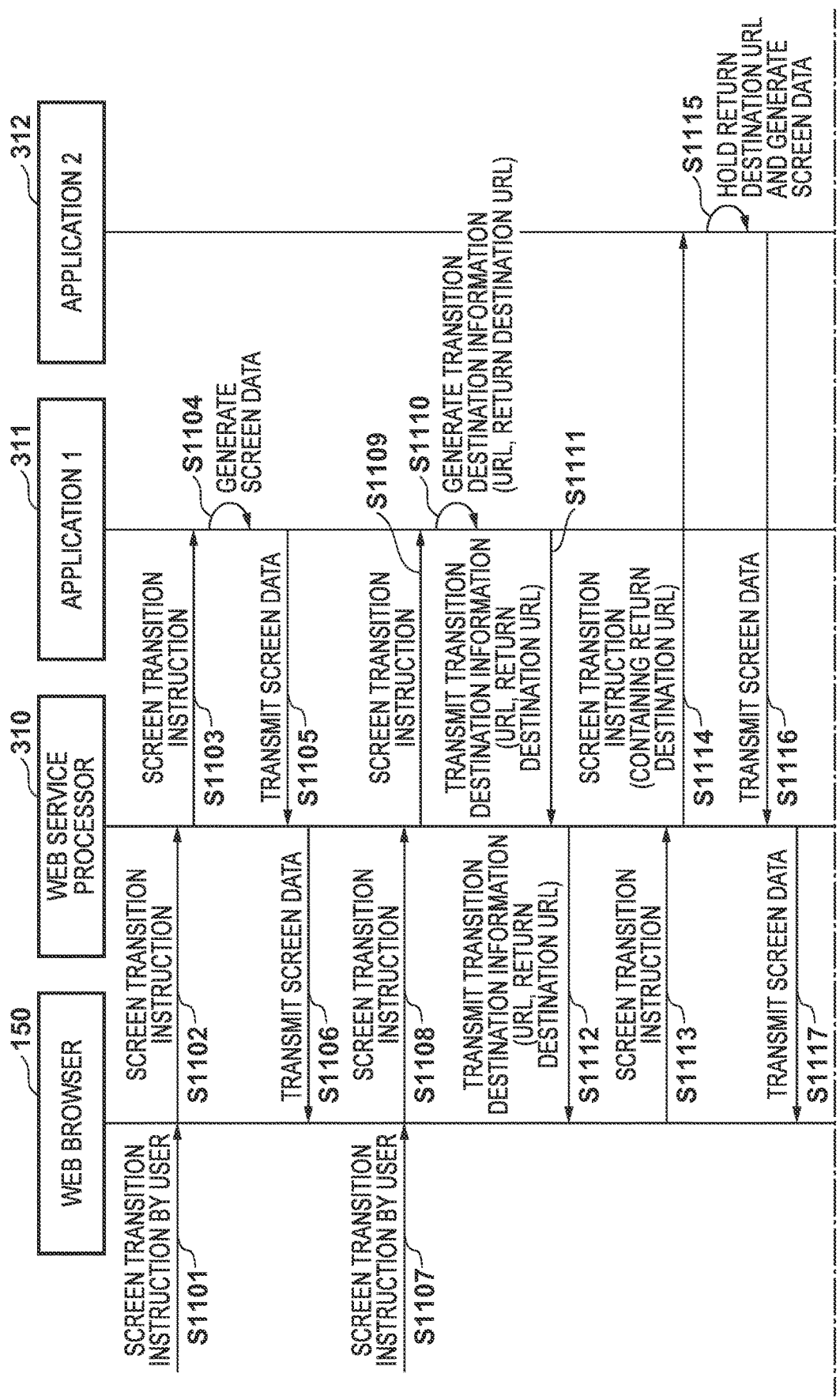

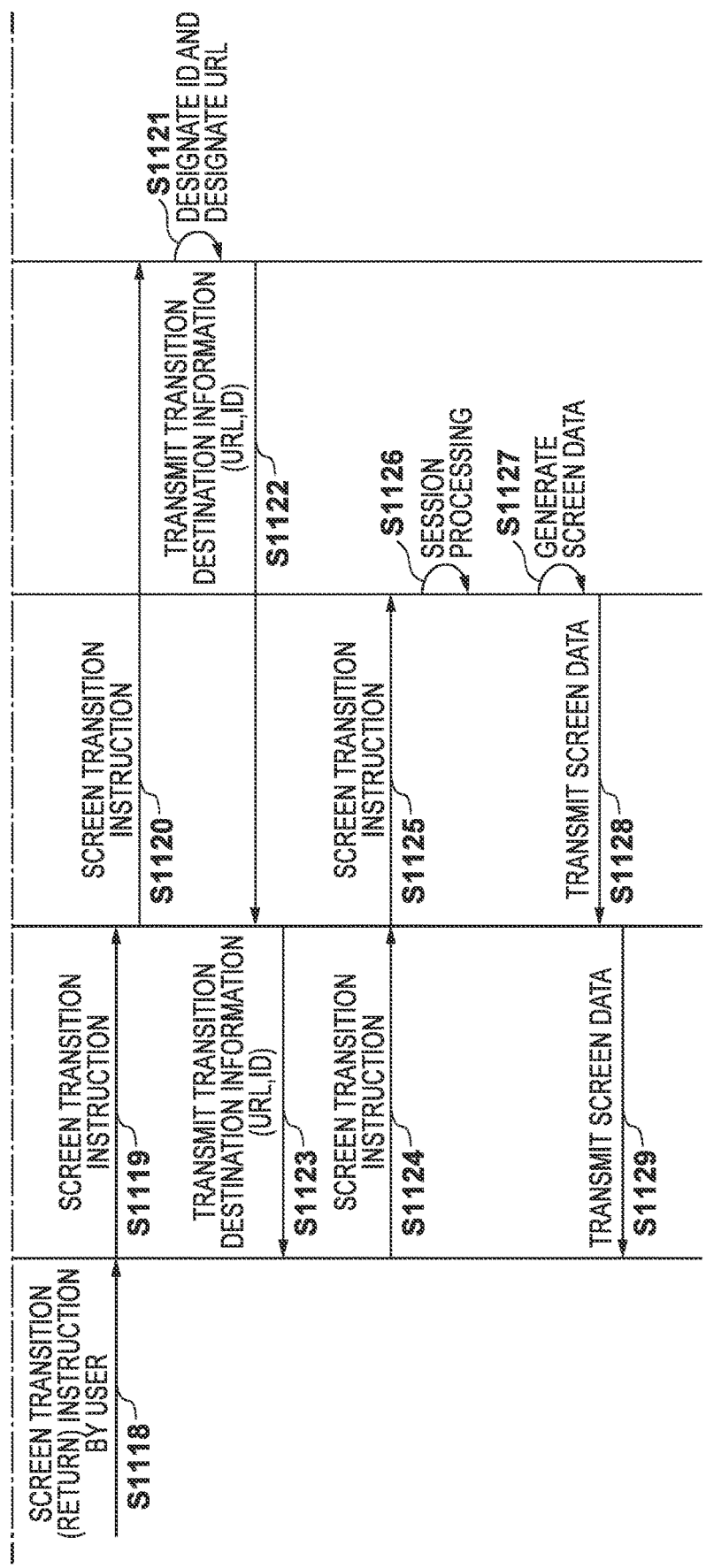

INFORMATION PROCESSING APPARATUS, METHOD FOR CONTROLLING THE SAME, AND STORAGE MEDIUM

BACKGROUND OF THE INVENTION

Field of the Invention

The present invention relates to an information processing apparatus which controls screen transition between applications operated by a web browser, a method for controlling the same, and a storage medium.

Description of the Related Art

Web applications provided by web servers operable by web browsers include an application which can set up a link to the screen of another web application and transit to the screen of the other application in accordance with, for example, a predetermined operation. When transiting from the screen of one application to the screen of another application, the URL of a transition destination screen can directly be designated in a menu on the corresponding screen. Also, there is an application having a menu which returns to the application screen of a transition source after transition to another application screen. For example, a method is known by which the URL of the screen of a transition source as a return destination is directly designated in an application menu of a transition destination.

Japanese Patent Laid-Open No. 2012-88940 has disclosed a method by which when a user executes processing by transiting a web browser, information specifying the processing executed by the user and attribute information necessary for screen display are accumulated as transition information for each web screen, and screen transition is performed using this transition information. More specifically, when the user selects a past web screen and requests the screen to be displayed, an identifier of the selected screen is acquired, the attribute information of the web screen is acquired by using this identifier, and the selected web screen is displayed.

Unfortunately, the above-mentioned related art has problems as described below. For example, when a plurality of screens exist as choices of the transition source and screen transition is performed from each screen to one transition destination, a return destination is fixed if the URL is directly designated in a menu or the like on the transition destination screen. Therefore, the transition source screen intended by the user is sometimes not returned to, and this impairs the user's convenience.

Also, when the URL for returning to the transition source is directly defined as a return destination beforehand, if the screen or menu configuration of the transition source is changed, applications of both the transition source and destination must be corrected, and this poses the problem of program maintainability. In addition, when returning to an application of the transition source after setting up a link to another application and transiting to it, if the URL of the link destination is directly designated, the URL may be known to and attacked by a third person. This poses the problem of security. Furthermore, if the URL of a directly designated link destination is directly designated from an application other than the transition destination, the screen of an application of the transition source may directly be attacked, and this also poses the problem of security.

SUMMARY OF THE INVENTION

The present invention enables realization of a mechanism which, even when a plurality of screens exist in a transition source when performing screen transition, suitably returns a transition destination screen to a transition source screen intended by the user, facilitates maintenance, and reduces a menace of an attack to the transition source screen.

One aspect of the present invention provides an information processing apparatus including a first application and a second application, comprising: a first transmitting unit configured to transmit screen data for displaying a screen of the first application to a web browser operating on an external apparatus; a first receiving unit configured to receive a screen transition instruction for transiting from the screen of the first application to a screen of the second application; a second transmitting unit configured to, when the screen transition instruction is received, store transition destination information indicating at least a return destination screen in a storage unit, and transmit screen data for displaying the screen of the second application to the web browser; a second receiving unit configured to receive a return instruction for returning from the screen of the second application to an original screen; and a determination unit configured to, when the return instruction is received, determine a return destination screen based on the transition destination information stored in the storage unit.

Another aspect of the present invention provides a method for controlling an information processing apparatus including a first application and a second application, comprising: transmitting screen data for displaying a screen of the first application to a web browser operating on an external apparatus; receiving a screen transition instruction for transiting from the screen of the first application to a screen of the second application; when the screen transition instruction is received, storing transition destination information indicating at least a return destination screen in a storage unit, and transmitting screen data for displaying the screen of the second application to the web browser; receiving a return instruction for returning from the screen of the second application to an original screen; and when the return instruction is received, determining a return destination screen based on the transition destination information stored in the storage unit.

Still another aspect of the present invention provides a non-transitory computer-readable storage medium storing a computer program which causes a computer to execute each step of a control method of the information processing apparatus.

Further features of the present invention will be apparent from the following description of exemplary embodiments with reference to the attached drawings.

BRIEF DESCRIPTION OF THE DRAWINGS

FIGS. 5A and 5B are sequence charts for explaining the operation of the information processing system according to the first embodiment;

FIG. 6 is a flowchart for explaining the operation of screen transition of an application 311 according to the first embodiment;

FIG. 9 is a view showing a data table indicating the contents of data saved as parameter data 414 according to the first embodiment;

FIG. 10 is a view showing a data table indicating the contents of data saved as the parameter data 414 according to the first embodiment; and FIGS. 11A and 11B are sequence charts for explaining the operation of an information processing system according to the second embodiment.

DESCRIPTION OF THE EMBODIMENTS

Embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

Information Processing System

The first embodiment of the present invention will be explained below with reference to FIGS. 1 to 10. First, the overall configuration of an information processing system 100 including an information processing apparatus according to this embodiment will be explained with reference to FIG. 1. The information processing system 100 includes an MFP 101, MFP 106, external web server 104, and client terminal (external apparatus) 105. These devices are connected across a network formed by a LAN (Local Area Network) 102 and Internet 103.

Also, the client terminal 105 has a web browser function capable of connecting to an external web service and operating a web application. The MFPs 101 and 106 have a copy function of scanning a paper medium, and printing an image on a sheet based on the scan data. Furthermore, these MFPs include a web server unit having a web site function capable of providing an application accessible and operable from the client terminal. Likewise, the external web server 104 includes a web server unit having a web site function capable of providing an application accessible and operable from the client terminal 105.

<Arrangement of MFP>

Figure 2:
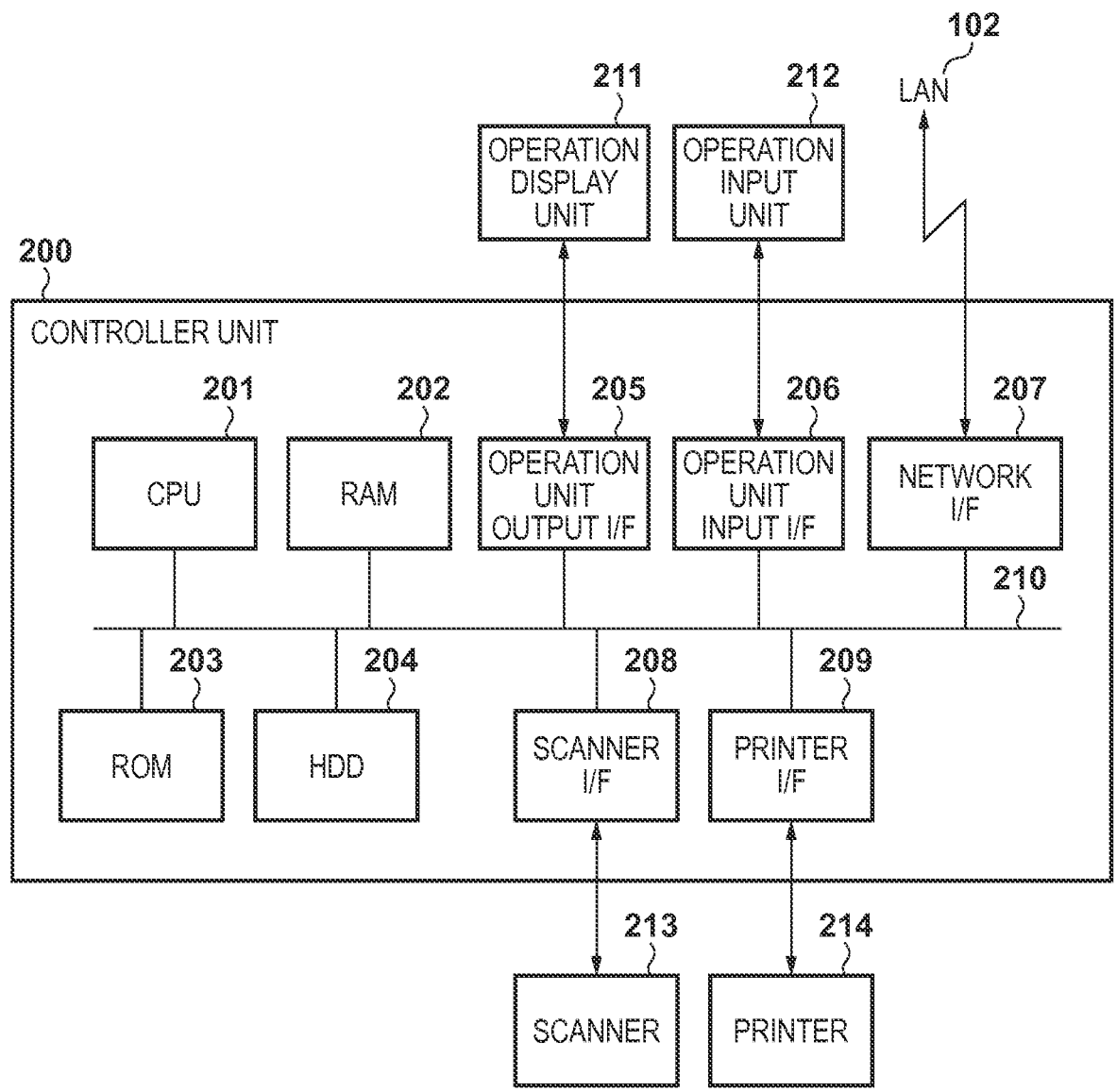
FIG. 2 is a block diagram showing the hardware configuration of an MFP 101 according to the first embodiment.

Next, the arrangement of the MFP 101 will be explained with reference to FIG. 2. The MFP 106 has the same arrangement as that of the MFP 101 to be explained below, so an explanation thereof will be omitted. The MFP 101 includes a controller unit 200 to which a scanner 213 and printer 214 can be connected, and an operation display unit 211, an operation input unit 212, and the LAN 102 can also be connected. The controller unit 200 includes a CPU 201, RAM 202, ROM 203, HDD 204, operation unit output I/F 205, operation unit input I/F 206, network I/F 207, scanner I/F 208, and printer I/F 209. The CPU (Central Processing Unit) 201 executes various control programs. The CPU 201 activates the system based on a boot program stored in the ROM (Read Only Memory) 203. In addition, the CPU 201 reads out a control program stored in the HDD (Hard Disk Drive) 204, and executes predetermined processing by using the RAM (Random Access Memory) 202 as a work area.

The HDD 204 stores various control programs including the functions of a web browser 402. The HDD 204 also stores scan data loaded from the scanner 213, and data acquired from outside the apparatus via the network I/F 207.

The operation unit output I/F 205 controls data output communication to the operation display unit 211. The operation input I/F 206 controls data input communication from the operation input unit 212. The network I/F 207 is connected to the LAN 102, and controls information input/output across the LAN 102. The scanner I/F 208 receives image data from the scanner 213, and performs scanner control data input/output. The printer I/F 209 outputs image data to the printer 214, and performs printer control data input/output. The components 201 to 209 are thus arranged on a system bus 210.

The operation input unit 212 is an interface which includes input devices such as a touch panel and hard keys and receives instructions from the user. The operation display unit 211 is an interface which includes a display device such as an LCD (Liquid Crystal Display) or LED (Light Emitting Diode) and displays information to the user.

The scanner 213 includes an optical reader such as a CCD (Charge Coupled Device), and has a function of optically manipulating a paper medium and reading the medium as electronic image data. The printer 214 has a function of forming the electronic image data as an image on a printing medium such as a paper sheet.

<Control Configuration>

Figure 1:
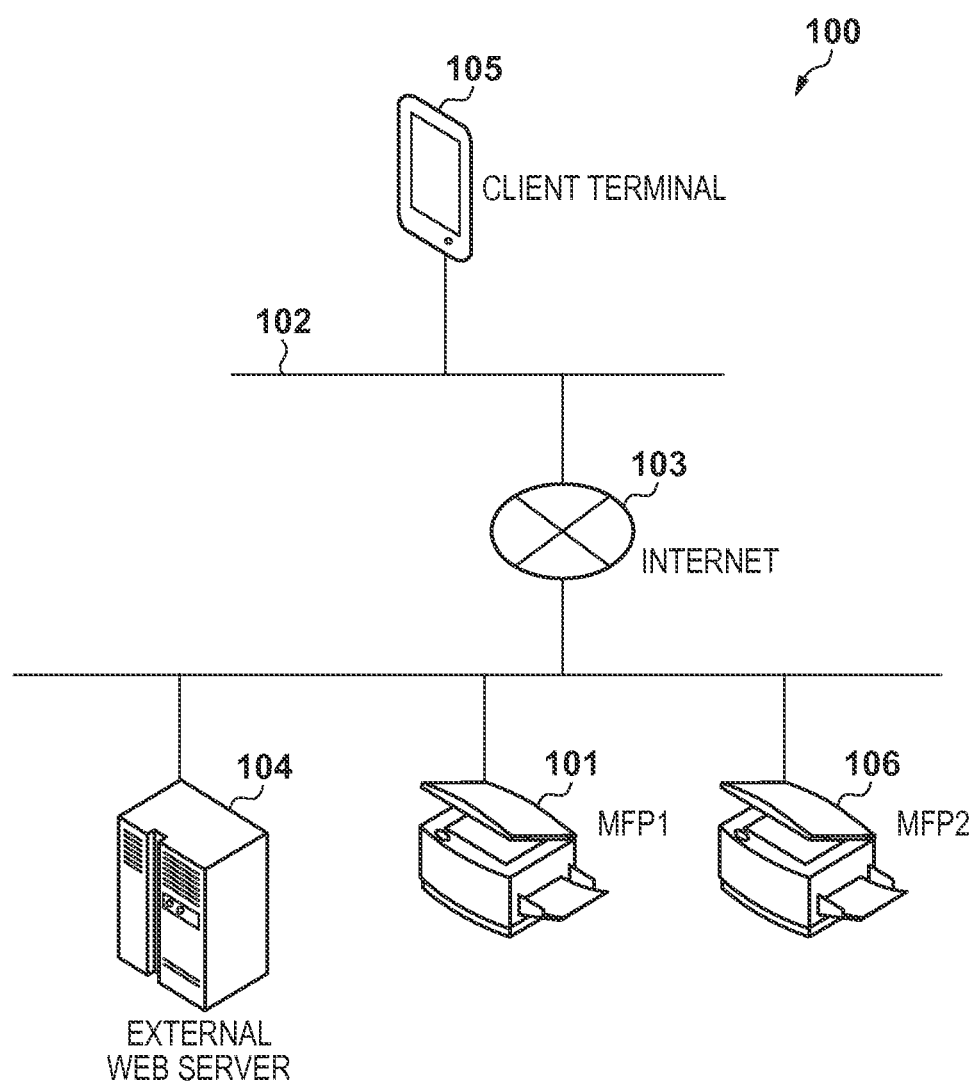
FIG. 1 is a view showing the whole of an information processing system according to the first embodiment.
Figure 3:
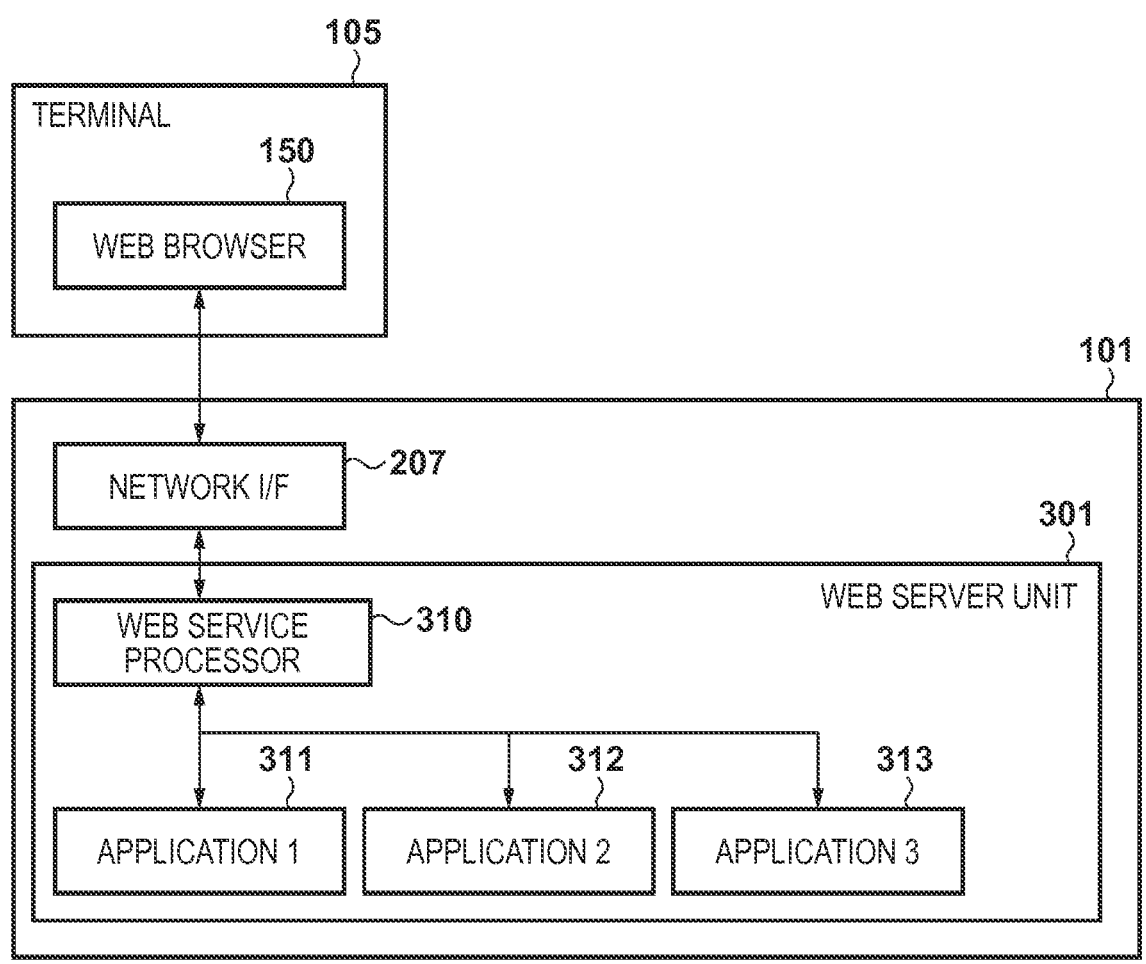
FIG. 3 is a view showing the control configuration of the information processing system according to the first embodiment.

The control configuration of the whole system including the image processing apparatus (information processing apparatus), for example, the MFP 101 will be explained below with reference to FIG. 3. Each functional unit shown in FIG. 3 is implemented by the CPU 201 in the MFP 101 by reading out the control program stored in the ROM 203 or HDD 204 to the RAM 202, and executing the readout program. The arrangement of the MFP 106 explained with reference to FIG. 1 is the same as that of the MFP 101, so the MFP 101 will be explained below, and an explanation of the MFP 106 will be omitted. Also, the external web server 104 can have the same control configuration, so an explanation of the external web server 104 will be omitted. That is, the arrangement of the MFP 101 to be explained below may also be implemented in the external web server 104. In this case, the external web server 104 manages a web application which provides a service (function) of the MFP 101, which is provided for the client terminal 105.

The MFP 101 includes a web server unit 301 and the above-described network I/F 207 as the control configuration. The network I/F 207 performs communication in order to provide web services to the external client terminal 105. The network I/F 207 also communicates with the external web server 104 and MFP 106 in order to use external web services.

The external client terminal 105 includes a web browser 150 in order to accept provided web services. More specifically, the external client terminal 105 transmits a request message to the web server unit 301 which provides web services, receives a response message transmitted from the web server unit 301, and displays the message on the screen of the web browser 150. The web services are provided in the form of a plurality of application programs of the web server unit 301. The web browser 150 of the client terminal 105 can use the web services of these applications, and can also operate the MFP 101 including the web server.

The arrangement of the web server unit 301 will now be explained. The web server unit 301 includes a web service processor 310 and applications 311, 312, and 313. Note that the application 311 corresponds to a first application, and the application 312 corresponds to a second application. The web service processor 310 accepts a request message from the web browser 150 as a client, and determines a web application service as a communication target in accordance with the request message. That is, the web service processor 310 has the function of an HTTP service. More specifically, the web service processor 310 accepts a URL as a request message, analyzes the URL, and determines, in accordance with the URL, which URL of one or more preregistered web applications the request is directed to. In accordance with the request, the web service processor 310 calls the corresponding web application together with the request. The above-described request message is more specifically an HTTP request message, and can contain the value of a parameter from a web browser linked to the URL.

The applications 311, 312, and 313 are web applications which provide web services, and have individual program configurations. Each application is preregistered in the web service processor 310, and can receive an instruction from the web service processor 310, communicate with the web browser 150, and provide a web service to the client terminal 105.

<Application Configuration>

Next, the configuration of the application 311 shown in FIG. 3 will be explained with reference to FIG. 4. Note that the applications 312 and 313 explained with reference to FIG. 3 have the same configuration as that of the application 311, so an explanation thereof will be omitted.

The application 311 includes a CGI processor 410, authentication processor 411, screen generator 412, parameter processor 413, parameter data 414, and device processor 415. The CGI processor 410 is called from the above-described web service processor 310, and accepts a request message from the web service processor 310. After that, the CGI processor 410 executes processing in order to provide a web service by the application 311, and transmits the result to the web service processor 310. Also, based on the above-described request message, the CGI processor 410 executes, for example, authentication processing, parameter processing, image generation processing, and device control processing (to be described later), in order to provide the web service.

When called from the CGI processor 410, the authentication processor 411 determines whether the request message is valid, processes a session for requesting authentication again, and executes authentication processing. More specifically, the authentication processor 411 analyzes the request message URL, parameter, HTTP header or request, or Cookie. In addition, the authentication processor 411 determines the authentication period of the request, determines whether the session is within the period, and determines whether the authentication processing is necessary again. The authentication processor 411 notifies the CGI processor 410 of the determination results.

When called from the CGI processor 410, the screen generator 412 performs screen generation processing in order to provide the web service. More specifically, based on the results processed by the CGI processor 410, the screen generator 412 generates an HTML screen necessary for the service from an HTML file of a template. This screen includes a menu button so arranged as to accept other web services of the application 311. Furthermore, this screen may also include a menu button for calling another web application such as the application 312.

When called from the CGI processor 410, the parameter processor 413 analyzes the parameter in the above-described request message, determines necessary processing, and notifies the CGI processor 410 of the result. Also, in accordance with a request from the CGI processor 410, the parameter processor 413 generates a necessary parameter, and transmits the parameter to the CGI processor 410. In addition, the parameter processor 413 can save an internal parameter of the request and the generated parameter as the parameter data 414 in the RAM 202 or HDD 204. Furthermore, the parameter processor 413 can call the saved parameter data 414 as needed. More specifically, the parameter data 414 generates and stores information linked to the screen, as the parameter in the request message. Based on the result of the parameter processor 413, the CGI processor 410 can cause the authentication processor 411 to execute the above-described authentication processing, and instruct the screen generator 412 to process a necessary screen.

When called from the CGI processor 410, the device processor 415 performs processing based on the instructions, for example, updates and refers to the set value of the MFP 101, and operates the actual MFP 101. Also, the device processor 415 notifies the CGI processor 410 of the referred set value, the operation result of the MFP 101, and the like. For example, there are application programs which refer to and update the settings of the MFP 101, and operate the scanner 213 or printer 214 of the MFP 101. These applications display information and a setting menu on the provided screen. The application programs also display a menu for operating each function of the MFP 101, and accept user's instructions. In this case, the above-described application programs can operate the functions of the MFP 101 by using the device processor 415.

The applications 311, 312, and 313 may also be application programs preregistered in the web server unit 301. Alternatively, the applications 311, 312, and 313 may also be application programs additionally installed in the web server unit 301 later. In this case, in a state in which an install service program is registered in the web server unit 301, application program additional install processing can be executed. The additionally installed application program is registered in the web service processor 310 by the above-described install service program, and can provide the same web service.

<Screen Transition Processing Sequence>

The screen transition processing sequence of the applications 311 and 312 of this embodiment will be explained below with reference to FIGS. 5A and 5B. Each operation shown in a sequence chart shown in FIGS. 5A and 5B is implemented by the CPU 201 of the MFP 101 by executing the control program. In this embodiment, an example in which the user instructs the reception of the web service of the application 311 will be explained.

In step S501, the user performs a user instruction by clicking, for example, a menu on the screen displayed in the web browser 150 in order to receive a necessary web application service. The web browser 150 receives this user instruction as a screen transition instruction. Subsequently, in step S502, the web browser 150 transmits the received screen transition instruction as a request message to the web service processor 310. In step S503, the web service processor 310 analyzes the request message, and performs the screen transition instruction on the application 311 in order to call it.

The application 311 generates screen data corresponding to the request message in step S504, and transmits the generated screen data to the web service processor 310 in step S505. In step S506, the web service processor 310 transmits the screen data received from the application 311 in step S504 to the web browser 150. Consequently, the user can receive the web service of the designated application 311.

In step S507, the user performs a user instruction on the web browser 150 in order to receive a new service from the received screen. More specifically, the user performs the user instruction by clicking, for example, a menu button on the screen displayed in the web browser 150. The web browser 150 receives this user instruction as a screen transition instruction. In this embodiment, an example in which the user clicks a menu button for receiving the web service of the application 312 among menu buttons on the screen displayed in the web browser 150 will be explained. In step S508, in accordance with the user instruction in step S506 described above, the web browser 150 transmits the screen transition instruction as a request message to the web service processor 310.

In step S509, the web service processor 310 performs the screen transition instruction on the application 311. In step S510, since the requested screen transition is the menu of the application 312, the application 311 generates a corresponding URL to redirect the screen of the application 312. In addition, the application 311 generates a screen ID and adds the ID as a parameter of the URL, thereby generating transition destination information. The transition destination information is information indicating a return destination screen from the screen of the application 312 as a transition destination based on this screen transition instruction. The parameter processor 413 shown in FIG. 4 described above performs this parameter processing. The generated parameter is stored as the above-described parameter data 414. Subsequently, in step S511, the application 311 transmits the generated transition destination information to the web service processor 310 as screen redirect processing.

In step S512, the web service processor 310 transmits the transition destination information to the web browser 150 once. In step S513, since the accepted request is redirect, the web browser 150 refers to the transition destination information containing the URL and screen ID, and transmits the screen transition instruction to the web service processor 310 based on the transition destination information. In step S514, the web service processor 310 calls the application 312 in order to perform the screen transition instruction on the application 312, because the URL in the transmitted request message is the menu of the application 312. In this step, the request for the screen transition instruction can contain information of the screen ID generated in step S509.

In step S515, the application 312 stores the screen ID (identifier) accepted from the web service processor 310 in step S513. The screen ID can be saved in a storage area of the RAM 202 or HDD 204 managed by the application 312. In addition, the application 312 generates screen data corresponding to the request message. In step S516, the application 312 transmits the generated screen data to the web service processor 310. In step S517, the web service processor 310 transmits the screen data received from the application 312 to the web browser 150. Accordingly, the user can receive the web service of the application 312 by using the web browser 150.

Next, a process when the user performs a screen transition instruction for returning to the screen of the application 311 as the transition source from the screen of the application 312 will be explained. In step S518, the user performs a user instruction by, for example, clicking a return menu on the screen displayed in the web browser 150 in order to return to the application 311. The web browser accepts this user instruction as a screen transition instruction.

In step S519, the web browser 150 transmits the screen transition instruction to the web service processor 310. In step S520, the web service processor 310 transmits the screen transition instruction to the application 312, and calls the application 312 in order to perform the screen transition instruction. In step S521, the application 312 refers to the screen ID stored in the storage area in step S514 described above, sets a temporary URL (virtual screen) of the application 311 as the transition source (return destination), and generates transition destination information by using the screen ID as a parameter. In step S522, the application 312 transmits the transition destination information to the web service processor 310 in order to redirect the set temporary URL.

In step S523, the web service processor 310 transmits the transition destination information to the web browser 150 once. In step S524, since the accepted request is redirect, the web browser 150 refers to the transition destination information containing the URL and screen ID, and transmits the screen transition instruction to the web service processor 310. In step S525, the web service processor 310 calls the application 311 in order to perform the screen transition instruction on the application 311, because the URL in the transmitted request message is the menu of the application 311. In this step, the request for the screen transition instruction contains, as a parameter, information of the screen ID generated in step S509 and set by the application 312 in step S521.

In step S526, the application 311 analyzes the contents of the URL and the parameter. More specifically, if the URL is a predefined temporary URL, the application 311 refers to the parameter data 414 generated and stored in step S519 described above, and determines a screen to which the designated parameter is allocated. Then, the application 311 determines a screen linked to parameter data matching the designated parameter, and generates transition destination information containing the new URL. In step S527, the application 311 transmits the generated transition destination information as screen redirect processing to the web service processor 310. In step S528, the web service processor 310 transmits the transition destination information to the web browser 150 once.

In step S529, since the accepted request is redirect, the web browser 150 refers to the transition destination information containing the URL and screen ID, and transmits the screen transition instruction to the web service processor 310. In step S530, the web service processor 310 calls the application 311 in order to perform the screen transition instruction on the application 311, because the URL in the transmitted request message is the menu of the application 311.

In step S531, the application 311 executes session processing. The authentication processor 411 shown in FIG. 4 described above performs this session processing. It is also possible to perform the authentication processing in addition to the session processing. The authentication processor 411 shown in FIG. 4 described above performs the authentication processing in this case as well.

In step S532, the application 311 generates transition source screen data based on the request message containing the URL information. The screen generator 412 shown in FIG. 4 described above performs this screen generation processing. In step S533, the application 311 transmits the generated screen data to the web service processor 310. In step S534, the web service processor 310 transmits the received image data to the web browser 150.

\<Processing Flow\>

Figure 7:
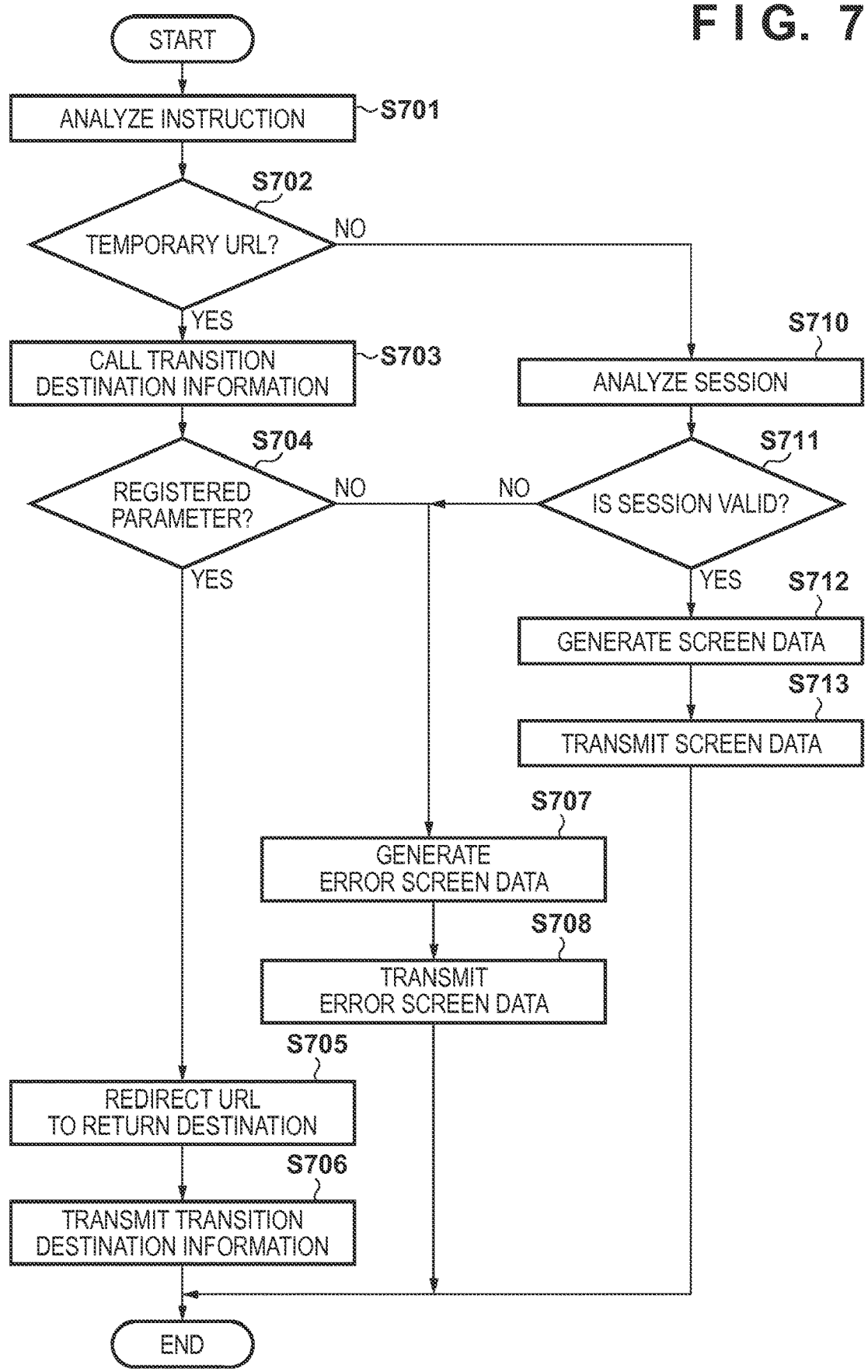
FIG. 7 is a flowchart for explaining the operation after screen transition of the application 311 according to the first embodiment.
Figure 8:
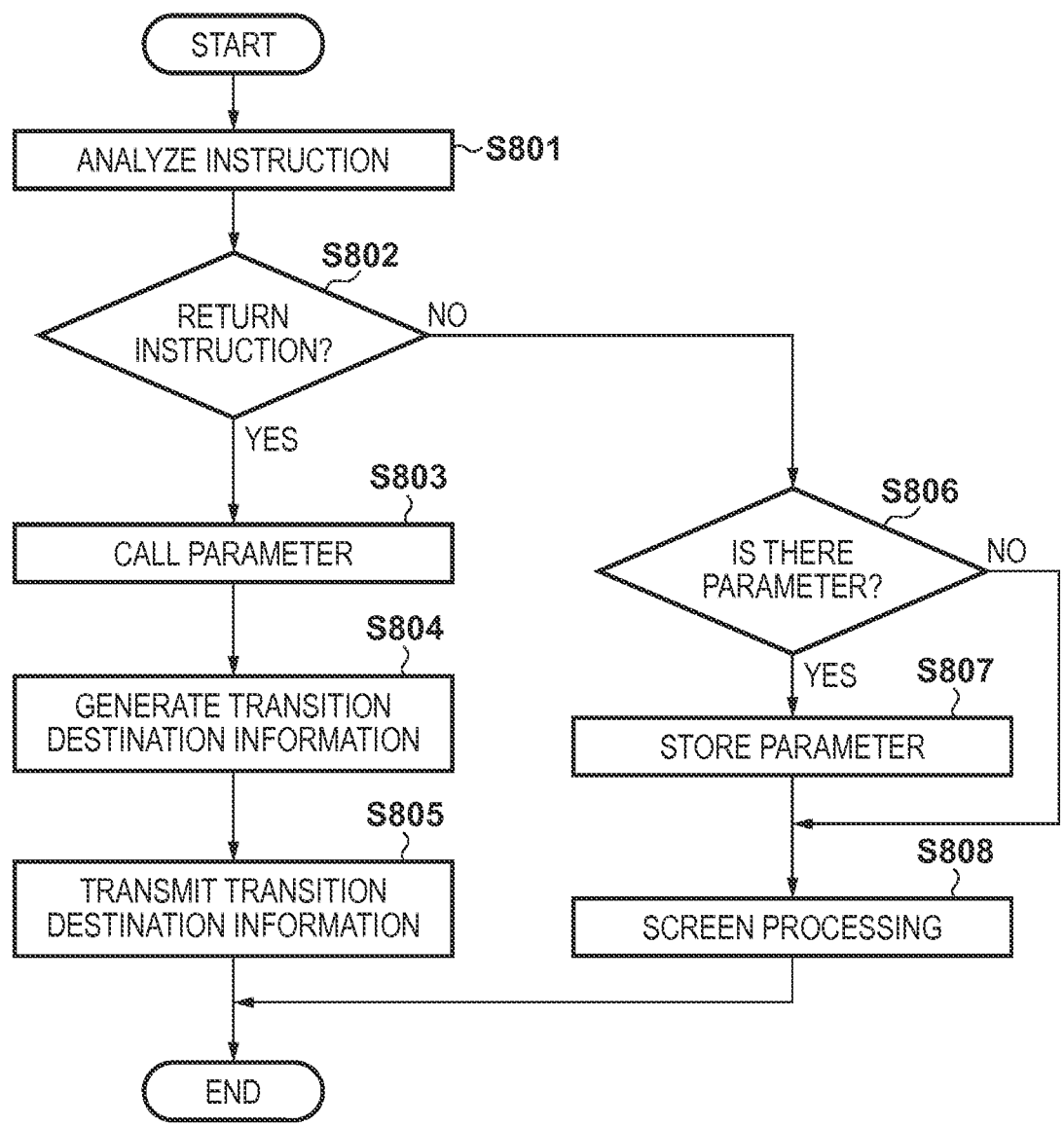
FIG. 8 is a flowchart for explaining the operation of an application 312 according to the first embodiment.

A processing flow when performing screen transition between the applications 311 and 312 will be explained below with reference to FIGS. 6 to 8. First, the procedures of screen transition of the application 311 will be explained with reference to FIG. 6. This explanation will be made by adding an explanation to the operations of the application 311 in steps S501 to S516 in FIG. 5A described above.

In step S601, the application 311 analyzes the instruction contents of the request message received from the web service processor 310. The CGI processor 410 performs this processing. More specifically, the CGI processor 410 finds by analysis a menu as a target of the request from the URL of the request message.

In step S602, the application 311 determines based on the analytical result whether the request is application screen transition. Since a request message as application screen transition can be predefined, it is also possible to determine whether the request message is the transition to a predefined application screen. If it is determined in step S602 that the request message is not application screen transition, the process advances to step S604, and the application 311 executes a normal operation of the application 311 or normal processing such as screen generation, and terminates the process. Note that normal processing such as screen generation is equivalent to step S504 in FIG. 5A described above.

On the other hand, if it is determined in step S602 that the request message is application screen transition, the process advances to step S603, and the application 311 generates transition destination information for performing screen transition to the corresponding application. More specifically, this transition destination information contains the URL for screen transition to the application 312, and the screen ID as a parameter. Subsequently, in step S605, the application 311 stores the generated URL and screen ID in association with each other as the parameter data 414 in a table. These processes in steps S603 and S605 are equivalent to step S510 in FIG. 5A described above. In step S606, the application 311 transmits the generated screen data to the web service processor 310, and terminates the process. This processing in step S606 is equivalent to step S511 in FIG. 5A described above.

Next, the procedures of screen transition when returning to the transition source of the application 311 will be explained with reference to FIG. 7. This explanation will be made by adding an explanation to the operations of the application 311 in steps S524 to S534 in FIG. 5B described above.

In step S701, the application 311 analyzes the instruction contents of the request message received from the web service processor 310. The CGI processor 410 performs this processing. More specifically, the CGI processor 410 finds by analysis a menu as a target of the request from the URL of the request message.

In step S702, the application 311 determines based on the analytical result whether the URL is a temporary URL. Since a temporary URL can be predefined, the application 311 determines whether the URL in the request message is a predefined temporary URL. If it is determined in step S702 that the URL is a temporary URL, the process advances to step S703, and the application 311 refers to the parameter table stored in the parameter data 414 in order to confirm the parameter of the request message. After that, the process advances to step S704.

In step S704, the application 311 determines whether the parameter data of the request message is registered in the parameter table. The parameter data herein mentioned is the screen ID. That is, the application 311 searches the parameter table for the corresponding data by using the screen ID as a search key. Furthermore, the screen ID and the URL of the transition destination screen are associated with each other and registered as a table in the parameter data 414 in step S605 of FIG. 6 described above. Accordingly, the application 311 can specify the URL of the transition destination screen from the screen ID. It is also possible to predefine the screen ID as the parameter data.

If it is determined in step S704 that the parameter of the request message is registered as the parameter data 414 in the table, the application 311 determines that the return destination screen is specified, and advances to step S705. In step S705, the application 311 sets the transition destination screen in the URL and generates transition destination information in order to perform redirect processing. These processes in steps S702 to S705 are equivalent to step S526 in FIG. 5B described above. Subsequently, the process advances to step S706, and the application 311 transmits the generated transition destination information to the web service processor 310, and terminates the process. This processing in step S706 is equivalent to step S527 in FIG. 5B described above.

If it is determined in step S704 that the parameter of the request message is not registered as the parameter data 414 in the table, the application 311 advances to step S707 to execute error processing. In step S707, the application 311 generates screen data of an error screen showing that, for example, there is no corresponding screen. Subsequently, the process advances to step S708, and the application 311 transmits the error screen data to the web service processor 310, and terminates the process.

On the other hand, if it is determined in step S702 that the URL is not a temporary URL, the process advances to step S710, and the application 311 analyzes the session. More specifically, the application 311 analyzes the request message URL, parameter, HTTP header and request, or Cookie, and acquires session information. Then, the process advances to step S711, and the application 311 determines the validity of the session, for example, determines whether the session information is within the period of validity.

Figure 4:
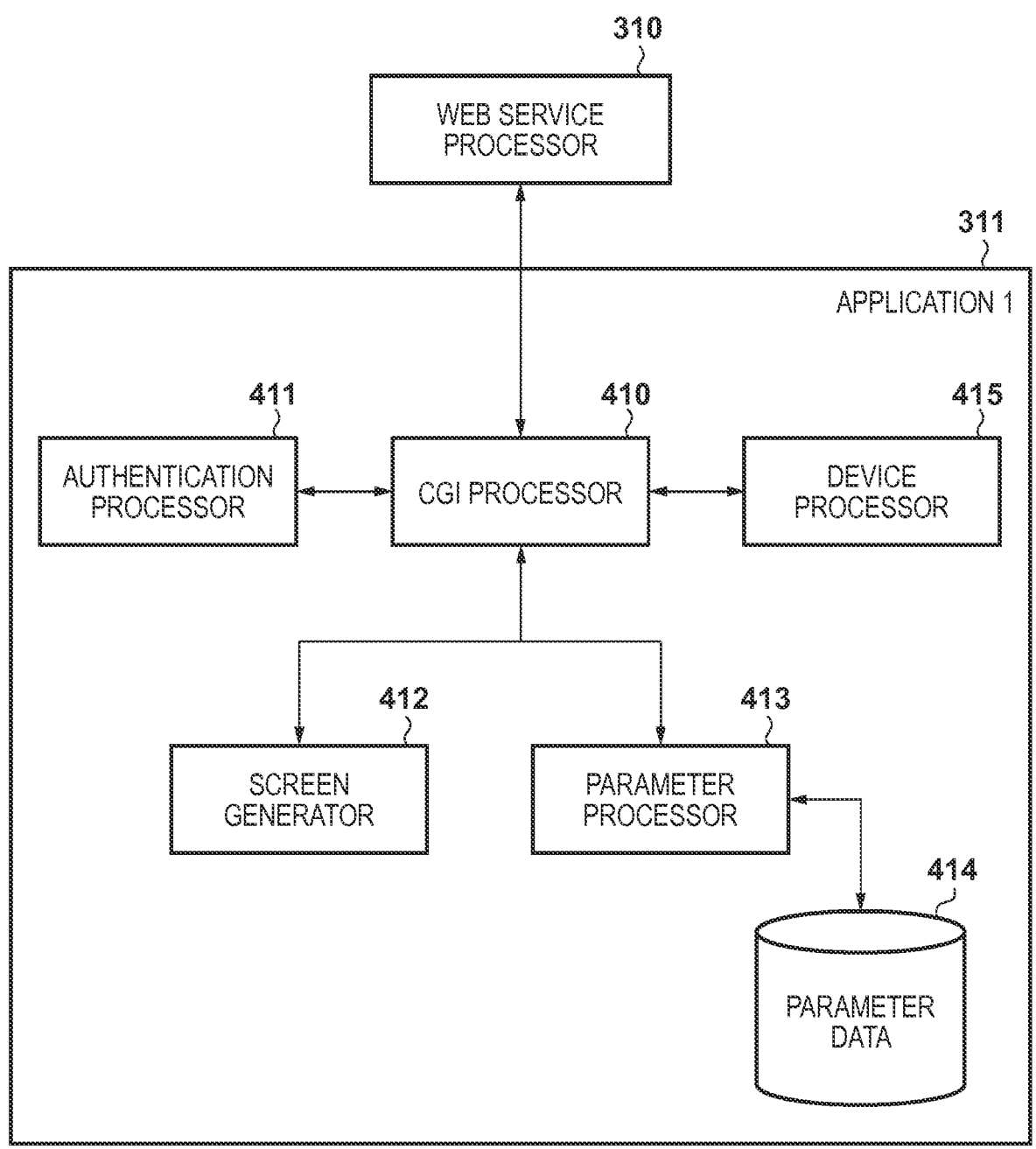
FIG. 4 is a view showing the software configuration of an information processing system of an application of a web server unit 301 according to the first embodiment.

The authentication processor 411 shown in FIG. 4 performs the session analysis in step S710 and the session determination in step S711. Also, the processes in steps S710 and S711 are equivalent to step S531 in FIG. 5B described above. If it is determined in step S711 that the session is valid, the process advances to step S712, and the application 311 generates screen data of the corresponding screen. Subsequently, the process advances to step S713, and the application 311 transmits the generate screen data to the web service processor 310, and terminates the process. It is also possible to perform authentication determination by executing authentication processing in addition to or in place of the session determination. In this case, if the authentication fails, the application 311 advances to step S707 and executes error processing.

If it is not determined in step S711 that the session is valid, the process advances to step S707 to execute error processing. In step S707, the application 311 generates error screen data indicating that, for example, the session is invalid. The process then advances to step S708, and the application 311 transmits this error screen data to the web service processor 310, and terminates the process.

The procedures of screen transition of the application 312 will now be explained with reference to FIG. 8. This explanation will be made by adding an explanation to the operations of the application 312 in steps S513 to S522 in FIG. 5B described above.

In step S801, the application 312 analyzes the instruction contents of the request message received from the web service processor 310. The CGI processor 410 performs this processing. More specifically, the CGI processor 410 finds by analysis a menu as a target of the request from the URL of the request message.

In step S802, the application 312 determines based on the analytical result whether the request message is a screen transition instruction to the transition source. Since a request message can be predefined as screen transition to the transition source, the application 312 determines whether the request message is a screen transition instruction to a predefined transition source.

If it is not determined in step S802 that the request message is a screen transition instruction to the transition source, the process advances to step S806. In step S806, the application 312 determines whether the request message contains a parameter. More specifically, the application 312 determines whether there is a screen ID parameter as parameter information following the URL of the request message. If it is determined in step S806 that there is parameter information, the process advances to step S807, and the application 312 stores the parameter. In this storage processing, the parameter can be stored as the parameter data 414 of the application 312, in the same manner as that for the application 311 explained with reference to FIG. 4 described above. Subsequently, the process advances to step S807, and the application 312 executes screen processing in order to perform screen transition, and terminates the process. If it is determined in step S806 that there is no screen ID as a parameter in the request message, the process advances to step S808 without executing step S807, and he application 312 executes screen processing in order to perform screen transition, and terminates the process.

On the other hand, if it is determined in step S802 that the request message is a screen transition instruction to the transition source, the process advances to step S803, and the application 312 refers to the parameter as the screen ID stored in step S807 described above. Then, the application 312 generates transition destination information in step S804. More specifically, the application 312 designates a predetermined temporary URL of the transition source as the URL, and adds the referred (acquired) parameter information as parameter information of the URL. These processes in steps S803 and S804 are equivalent to step S521 in FIG. 5B described above. Subsequently, the process advances to step S805, and the application 312 transmits the transition destination information to the web service processor 310, and terminates the process. This processing in step S805 is equivalent to step S522 in FIG. 5B described above.

<Parameter Data>

The table stored as the parameter data 414 shown in FIG. 4 will be explained below with reference to FIG. 9. Referring to FIG. 9, the total number of screen IDs registered in this table is managed as N. In this example, the total number N is 3. Also, a screen ID and a URL linked to the screen ID are registered as names of a CGI. For example, when the screen ID is "AAAAAAA", the URL of a transition destination URL is "A1.cgi" which designates the CGI. When the screen ID is "BBBBBBB", the URL of a transition destination screen is "B1.cgi" which designates the CGI.

A case in which the screen ID is "AAAAAAA" will be explained as an example of the URL for practical screen transition. When the screen ID is "AAAAAAA", the URL of a transition destination screen is "A1.cgi" which designates the CGI. When transiting from the screen of "A1.cgi" to the screen of the application 312, therefore, the application 311 designates the corresponding URL and "AAAAAAA" as a parameter. Examples of the URL and parameter are /Appli2.cgi/?Lang= JA&DID=AAAAAAA&Dummy=123456. In this example of the URL, "Appli2.cgi" is designated as the transition destination of the application 312. In addition, Lang for designating the language, DID as the screen ID explained in this embodiment, and a Dummy parameter are designated as parameters. In the transition destination of the application 312, the DID as a parameter of the screen ID is temporarily stored. When returning to the application 311 in the transition destination, the dummy URL and this parameter are designated.

Examples of the URL and parameter when the application 312 returns to the application 311 are /Appli1tmp.cgi/ ?Lang=JA&DID=AAAAAAA&Dummy=321654. In this example of the URL, "Appli1tmp.cgi" as a predetermined temporary URL is designated as the return destination of the application 311. Also, as a parameter of the screen ID, "AAAAAAA" designated by the application 311 in the transition source is directly designated.

When a temporary URL is designated in the above-mentioned transition source (application 311), the URL of a true return destination matching the screen ID field of the parameter data table can be specified from the parameter "AAAAAAA" as the screen ID. In this example, "A1.cgi" can be specified as the true return destination.

Screen Examples

Next, examples of the screens of the applications 311 and 312 will be explained with reference to FIG. 10. A screen 1000 in FIG. 10 shows an example of the screen of the application 311. The screen 1000 is displayed in the web browser 150, and shows the way the header of the application 311 and each menu are arranged. A menu 1001 is an example of a menu for transiting to the application 312.

A screen 1010 shows an example of the screen of the application 312. The screen 1010 is displayed in the web browser 150, and shows the way the header of the application 312 and each menu are arranged. A menu 1011 is an example of a menu for transiting to the application 311 as a transition source.

In this embodiment, an example in which the web server unit 301 exists and operates in the MFP 101 has been explained. However, the web server unit 301 may also exist and operate in the MFP 106 as another MFP or in the external web server 104. In addition, the applications 311, 312, and 313 as a plurality of applications may also exist in a plurality of dispersed web server units, instead of one web server unit. In this case, the application 311 can exist in the web server unit of the external web server 104 and perform the same operation, and the application 312 can exist in the web server unit of the external MFP 101 and perform the same operation.

In this embodiment as has been explained above, the information processing apparatus provides a screen to the web browser of an external apparatus. When screen transition occurs, an application in the transition source generates transition destination information indicating the return destination from an application in the transition destination, and notifies of the generated information. On the other hand, the application in the transition destination receives and holds the transition destination information. When receiving a screen return instruction, the application in the transition destination executes screen transition by using the held transition destination information. Accordingly, when a plurality of screens exist in the transition source and screen transition is to be performed from each screen to one transition destination, the user can return to the screen of the intended transition source. Also, the URL of the return destination is not prefixed. If the screen or menu configuration of the transition source is changed, therefore, the application in the transition destination need not be corrected, so the maintenability of the program is maintained. Furthermore, the URL of the transition source screen is not directly designated by, for example, a menu or return button on the screen. This makes it possible to increase the security, for example, reduce a menace of an attack to the transition source screen.

Second Embodiment

The second embodiment of the present invention will be explained below with reference to FIGS. 11A and 11B. Note that the system configuration and the like are the same as those of the above-mentioned first embodiment, so only portions different from the first embodiment will be explained, and an explanation of the same portions will be omitted. In this embodiment, the screen ID explained with reference to FIGS. 5A and 5B described above is not transmitted as transition destination information, but the URL of a return destination is directly transmitted as transition destination information. Note that in the related art, the URL of the return destination is directly linked to a menu or return button on the screen of the transition destination. This embodiment differs from the related art in that the return destination is directly designated by the URL, but each screen (application) of the transition source can designate the return destination.

FIGS. 11A and 11B show a screen transition processing sequence of applications 311 and 312 in this system of the second embodiment. Each operation is implemented by a CPU 201 of an MFP 101 by executing a control program. In this embodiment, an example in which the user the reception of the web service of the application 311 will be explained.

In step S1101, the user performs a user instruction by clicking, for example, a menu on the screen displayed in a web browser 150 in order to receive a necessary web application service. In step S1102, the web browser 150 transmits the screen transition instruction as a request message to a web service processor 310. In step S1103, the web service processor 310 analyzes the request message, and performs the screen transition instruction on the application 311 in order to call it. In step S1104, the application 311 generates screen data corresponding to the request message.

In step S1105, the application 311 transmits the generated screen data to the web service processor 310. In step S1106, the web service processor 310 transmits the screen data received from the application 311 in step S1104 to the web browser 150. Consequently, the user can receive the web service of the designated application 311.

In step S1107, the user performs a screen transition instruction on the web browser 150 in order to receive a new service from the received screen. More specifically, the user performs the screen transition instruction by clicking, for example, a menu button on the screen displayed in the web browser 150. In this embodiment, an example in which the user clicks a menu button for receiving the web service of the application 312 among menu buttons on the screen displayed in the web browser 150 will be explained.

In step S1108, in accordance with the user's instruction in step S1106 described above, the web browser 150 transmits the screen transition instruction as a request message to the web service processor 310. In step S1109, the web service processor 310 performs the screen transition instruction on the application 311.

In step S1110, since the requested screen transition is the menu of the application 312, the application 311 generates a corresponding URL to redirect the screen of the application 312. In addition, as a return destination URL, the application 311 adds the URL of the screen as a parameter of the URL, thereby generating transition destination information. A parameter processor 413 shown in FIG. 4 described above performs this parameter processing. The generated parameter is stored as above-described parameter data 414.

In step S1111, the application 311 transmits the generated transition destination information to the web service processor 310 as screen redirect processing. In step S1112, the web service processor 310 transmits the transition destination information to the web browser 150 once. In step S1113, since the accepted request is redirect, the web browser 150 refers to the transition destination information containing the URL and return destination URL, and transmits the screen transition instruction to the web service processor 310. In step S1114, the web service processor 310 calls the application 312 in order to perform the screen transition instruction on the application 312, because the URL in the transmitted request message is the menu of the application 312. In this step, the request for the screen transition instruction can contain information of the return destination URL generated in step S1109.

In step S1115, the application 312 stores the return destination URL accepted from the web service processor 310 in step S1113. The return destination URL can be stored in a storage area of a RAM 202 or HDD 204 managed by the application 312. In addition, the application 312 generates screen data corresponding to the request message. In step S1116, the application 312 transmits the generated screen data to the web service processor 310. In step S1117, the web service processor 310 transmits the screen data to the web browser 150. Accordingly, the user can receive the web service of the application 312 by using the web browser 150.

Next, a sequence when the user performs a screen transition instruction for returning to the screen of the application 311 as the transition source from the screen of the application 312 will be explained from step S1118. In step S1118, the user performs a screen transition instruction by, for example, clicking a return menu on the screen displayed in the web browser 150 in order to return to the application 311.

In step S1119, the web browser 150 transmits the screen transition instruction to the web service processor 310. In step S1120, the web service processor 310 similarly transmits the screen transition instruction to the application 312, and calls the application 312 in order to perform the screen transition instruction. In step S1121, the application 312 refers to the return destination URL stored in step S1114 described above. Then, the application 312 sets the return destination URL as the URL of the application 311 as the transition source (return destination), and generates transition destination information. In step S1122, the application 312 transmits the transition destination information to the web service processor 310 in order to perform screen transition to the set return destination URL. In step S1123, the web service processor 310 transmits the transition destination information to the web browser 150 once.

In step S1124, since the accepted request is redirect, the web browser 150 refers to the transition destination information containing the return destination URL, and transmits the screen transition instruction to the web service processor 310. In step S1125, the web service processor 310 calls the application 311 in order to perform the screen transition instruction on the application 311, because the URL in the transmitted request message is the menu of the application 311.

In step S1126, the application 311 executes session processing. An authentication processor 411 shown in FIG. 4 described above performs this session processing in the same manner as in the first embodiment. It is also possible to perform the authentication processing in addition to the session processing. The authentication processor 411 shown in FIG. 4 described above performs the authentication processing in this case as well. In step S1127, the application 311 generates transition source screen data from the request message containing the URL information. A screen generator 412 shown in FIG. 4 described above performs this screen generation processing.

In step S1128, the application 311 transmits the generated screen data to the web service processor 310. In step S1129, the web service processor 310 transmits the received image data to the web browser 150.

In this embodiment as has been explained above, screen transition can be performed by directly transmitting the URL of a return destination as transition destination information instead of the screen ID explained in the above-mentioned first embodiment.

Other Embodiments

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2014-060796 filed on Mar. 24, 2014, which is hereby incorporated by reference herein in its entirety.

What is claimed is:

1. An image processing system in which an information processing apparatus and an image processing apparatus are communicably connected, the information processing apparatus being configured to use a web browser for displaying a screen based on data of a web page, and the image processing apparatus being configured to output the data of the web page, wherein the image processing apparatus has one or more controllers configured to:

perform a first web server application for outputting data of a first web page and a first screen ID wherein the first web page is a web page capable of executing a transition instruction to a third web page;

perform a second web server application for outputting data of a second web page and a second screen ID, wherein the second web page is a web page capable of executing a transition instruction to the third web page;

perform a third web server application for outputting data of the third web page, wherein the third web page includes a selection object for instructing a transition to a transition source web page; and return URL information of the first web page, in a case where a predetermined URL is accessed by using the first screen ID as the URL parameter, and return URL information of the second web page, in a case where the predetermined URL is accessed by using the second screen ID as the URL parameter, wherein the URL information of the first web page corresponding to the first screen ID is returned in a case where there has been a transition to the third web page from the first web page and the selection object on the third web page is selected, and the URL information of the second web page corresponding to the second screen ID is returned in a case where there has been a transition to the third web page from the second web page and the selection object on the third web page is selected, and wherein the information processing apparatus has one or more controllers configured to:

access the third web server application to obtain the data of the third web page, after accessing the first web server application or the second web server application; and cause a display to display the third web page using the web browser, receive an operation to select the selection object, and access a web page using the screen ID in the returned URL information as the URL parameter, the screen ID being a screen ID of a web page from which transition was made to the third web page.

2. The image processing system according to claim 1, wherein the predetermined URL is a URL of a CGI program.

3. The image processing system according to claim 1, wherein the URL parameter is query information and the query information included in a request received from the information processing apparatus further includes a dummy parameter.

4. The image processing system according to claim 1, wherein the third web server application is a web server application providing a function for changing settings of the image processing apparatus via the web browser of the information processing apparatus, and wherein the second web server application is a web server application providing a function related to management of an application installed in the image processing apparatus.

5. The image processing system according to claim 1, wherein the image processing apparatus further comprises:
a printing device, and
wherein the third web server application is a web server application providing a function for changing settings related to at least the printing device via the web browser of the information processing apparatus.

6. The image processing system according to claim 1, wherein the URL returned from the image processing apparatus is a redirect URL.

* * * * *